United States Patent
Meloche et al.

(10) Patent No.: US 8,982,507 B2
(45) Date of Patent: Mar. 17, 2015

(54) MAGNETIC FLUX BARRIER

(75) Inventors: Eric Meloche, Burnsville, MN (US);
Bin Lu, San Ramon, CA (US); Lixin Jia, Minneapolis, MN (US); Jianhua Xue, Maple Grove, MN (US); John David Westwood, San Jose, CA (US); Mark Anthony Gubbins, Donegal (IE); Alexandru Cazacy, Derry (IE)

(73) Assignee: Seagate Technology LLC, Cupertino, CA (US)

( * ) Notice: Subject to any disclaimer, the term of this patent is extended or adjusted under 35 U.S.C. 154(b) by 134 days.

(21) Appl. No.: 12/879,791

(22) Filed: Sep. 10, 2010

(65) Prior Publication Data

US 2012/0063032 A1 Mar. 15, 2012

(51) Int. Cl.
*G11B 5/127* (2006.01)
*G11B 5/31* (2006.01)

(52) U.S. Cl.
CPC ............ *G11B 5/1278* (2013.01); *G11B 5/3116* (2013.01); *G11B 5/315* (2013.01)
USPC .............. 360/125.03; 360/125.1; 360/125.11; 360/125.14; 360/125.15

(58) Field of Classification Search
USPC ............... 360/125.14–125.15, 125.01, 125.1, 360/125.11
See application file for complete search history.

(56) References Cited

U.S. PATENT DOCUMENTS

| | | | |
|---|---|---|---|
| 5,582,927 A * | 12/1996 | Andricacos et al. .......... | 428/812 |
| 5,820,924 A * | 10/1998 | Witcraft et al. ............... | 427/130 |
| 6,771,464 B2 | 8/2004 | Minor | |
| 6,813,115 B2 * | 11/2004 | Van der Heijden et al. ........................ | 360/125.12 |
| 6,922,317 B2 | 7/2005 | Kirschenbaum et al. | |
| 7,295,401 B2 | 11/2007 | Jayasekara et al. | |
| 7,715,152 B2 | 5/2010 | Okada et al. | |
| 8,035,930 B2 | 10/2011 | Takano et al. | |
| 2002/0126422 A1 * | 9/2002 | Westwood ..................... | 360/317 |
| 2002/0126425 A1 * | 9/2002 | Balamane et al. ........ | 360/324.12 |
| 2004/0233578 A1 * | 11/2004 | Gao .............................. | 360/125 |
| 2007/0207348 A1 | 9/2007 | Mukai | |
| 2009/0034119 A1 | 2/2009 | Takahashi et al. | |
| 2009/0122445 A1 * | 5/2009 | Jiang et al. ............... | 360/123.12 |
| 2009/0154021 A1 | 6/2009 | Nunokawa et al. | |
| 2009/0231755 A1 | 9/2009 | Takahashi et al. | |

FOREIGN PATENT DOCUMENTS

| | | |
|---|---|---|
| JP | 2005-190518 A | 7/2005 |
| JP | 2005190518 A | 7/2005 |
| JP | 2007095304 A | 4/2007 |

(Continued)

*Primary Examiner* — Wayne Young
*Assistant Examiner* — Carlos E Garcia
(74) *Attorney, Agent, or Firm* — Westman, Champlin & Koehler, P.A.

(57) ABSTRACT

Data storage systems having barriers that may reduce erasure flux and increase write-ability are provided. Data storage systems include a writing element. The writing element has a write pole with a flare region. A magnetic flux barrier is located along the write pole flare region. The magnetic flux barrier is illustratively made from an in-plane magnetically anisotropic material that has an easy plane of magnetization. In another embodiment, a data storage system includes a writing element having an air bearing surface and a shield at the air bearing surface. The shield has a magnetic permeability of approximately zero. The shield illustratively includes alternating layers of positive and negative permeabilities. The shield optionally includes a plurality of shields that may include top, bottom, and side shields.

18 Claims, 17 Drawing Sheets

(56) References Cited

FOREIGN PATENT DOCUMENTS

| | | | |
|---|---|---|---|
| JP | 2008204584 A | 9/2008 |
| JP | 2009-093783 A | 4/2009 |
| JP | 2009-146517 A | 7/2009 |
| JP | 2010079970 A | 4/2010 |

* cited by examiner

MAGNETIC FLUX BARRIER

BACKGROUND

Data storage systems commonly include one or more recording heads that read and write information to a recording medium. When areal density of data storage systems is increased, they are able to store more information for a given area.

One factor that may influence areal density is erasure flux. In at least some data storage systems, recording heads write information to recording media in concentric tracks. For example, a recording medium may store information in adjacent concentric tracks that go from the center of the recording medium to the outer perimeter of the recording medium. Occasionally, when a recording head is writing information to one particular track of a recording medium, the recording head has an effect on another track. For instance, one issue is known as side track erasure. In one particular example of side track erasure, a recording head is writing to a track, and it generates magnetic flux that erases information stored in one or more adjacent tracks. This magnetic flux may limit aerial density.

SUMMARY

An aspect of the disclosure relates to barriers that may reduce erasure flux and increase write-ability in data storage systems. In one embodiment, a data storage system includes a writing element. The writing element has a write pole with a flare region. A magnetic flux barrier is located along the write pole flare region. The magnetic flux barrier is illustratively made from an in-plane magnetically anisotropic material that has an easy plane of magnetization.

In another embodiment, a data storage system includes a writing element having an air bearing surface and a shield at the air bearing surface. The shield has a magnetic permeability of approximately zero. The shield illustratively includes alternating layers of positive and negative permeabilities. The shield optionally includes a plurality of shields that may include top, bottom, and side shields.

DETAILED DESCRIPTION

Embodiments of the present disclosure include barriers that may reduce erasure flux and improve write-ability in data storage systems. In one embodiment, a barrier is placed along the flare region of a write pole. The barrier is illustratively made from an in-plane magnetically anisotropic material that has an easy plane of magnetization. In at least some circumstances, the barrier acts to reduce the amount of erasure flux and increase the amount of write flux by redirecting magnetic flux towards the write pole tip. In another embodiment, barriers are placed to the top, bottom, and/or sides of a write pole tip. The barriers illustratively have magnetic permeability values of zero and deflect magnetic flux away from areas that could cause erasures. The zero permeability barriers may also in at least some embodiments increase write flux by increasing the amount of available flux in the write pole.

Before going into further details of embodiments, it is worthwhile to first describe illustrative operating environments in which certain embodiments may be incorporated. Although certain embodiments may be incorporated in environments such as those shown in FIGS. 1-4, embodiments are not limited to any particular environment and are illustratively practiced in any number of environments.

Figure 1:
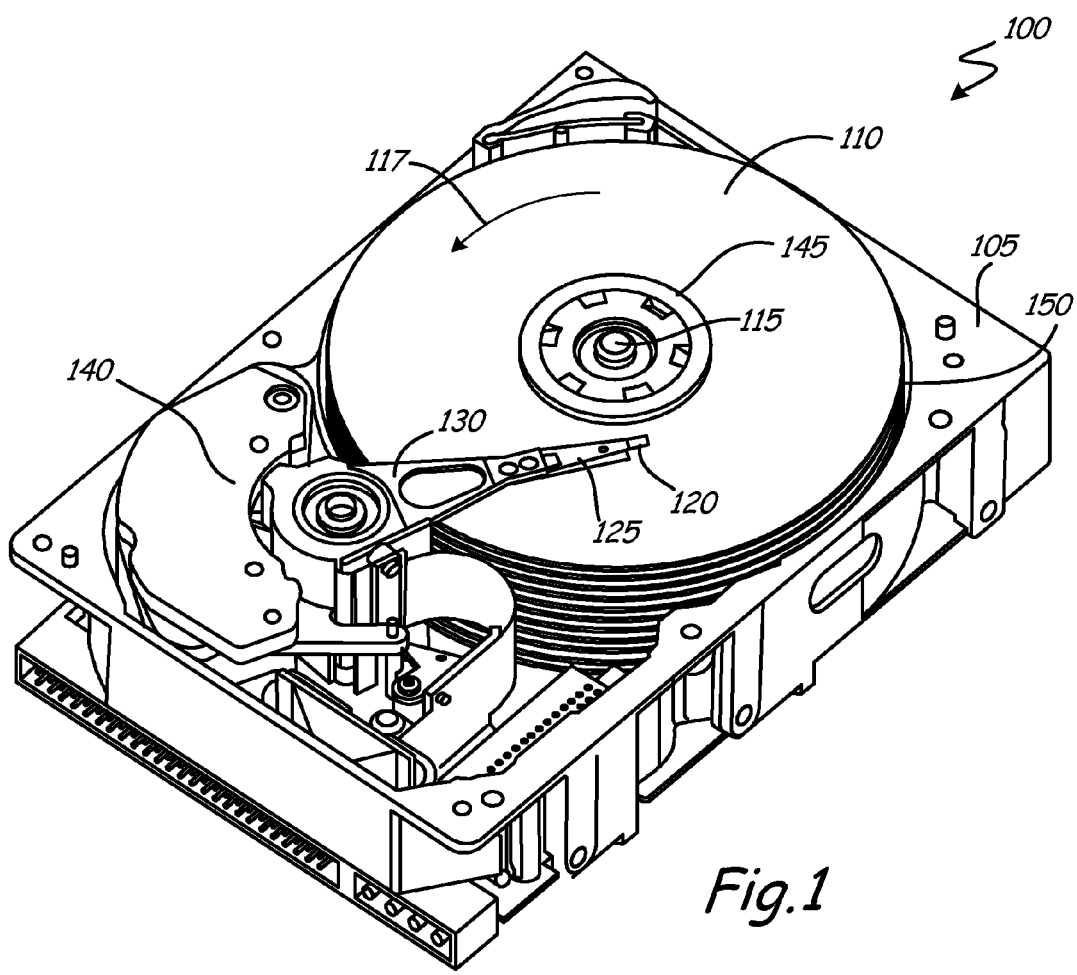
FIG. 1 is a perspective view of a data storage system according to an embodiment.

FIG. 1 is a perspective view of a hard disc drive 100. Hard disc drives are a common type of data storage system. While embodiments of this disclosure are described in terms of disc drives, other types of data storage systems should be considered within the scope of the present disclosure. Disc drive 100 includes an enclosure 105. Disc drive 100 further includes a disc or recording medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in a path between a disc inner diameter 145 and a disc outer diameter 150.

Medium 110 illustratively includes a number of concentric recording tracks between disc inner diameter 145 and disc outer diameter 150.

Figure 2:
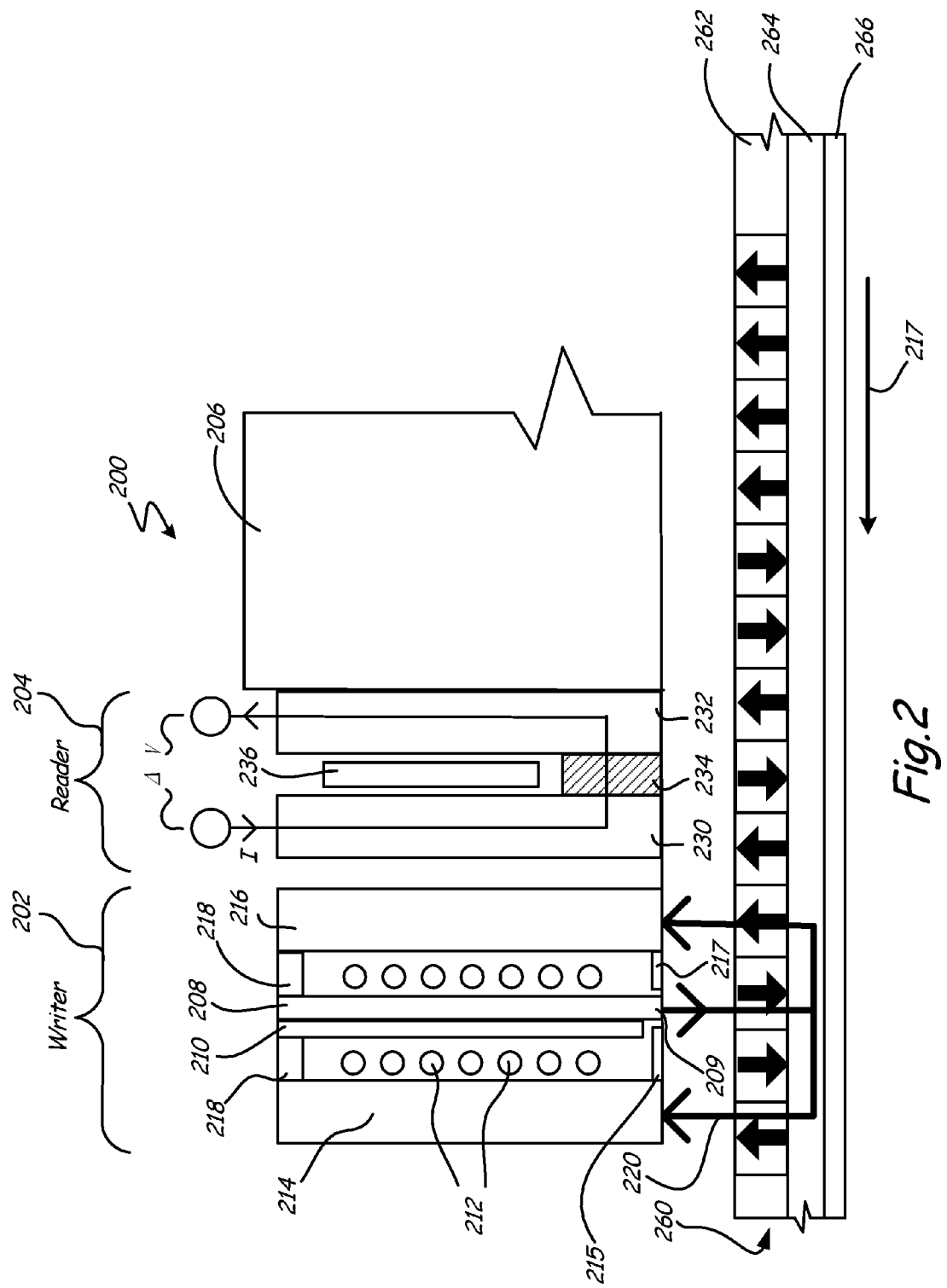
FIG. 2 is a schematic diagram of a cross-section of a recording head writing to a recording medium according to an embodiment.

FIG. 2 is a schematic diagram of a cross-section of a recording head 200 writing to a recording medium 260. Recording head 200 is illustratively carried by a slider such as slider 120 in FIG. 1, and medium 260 is illustratively a storage medium such as medium 110 in FIG. 1. FIG. 2 is a simplified diagram only showing cross-sectional views of some components of a recording head. Those skilled in the art will recognize that recording heads commonly include other components such as, but not limited to, insulating materials and additional electrical connection points.

Head 200 includes a writing element 202, a reading element 204, and a main body 206. For simplification purposes, only a portion of main body 206 is shown in the figure. Those skilled in the art will recognize that main body 206 illustratively includes an air bearing surface that helps control the "fly height" or head-to-media spacing between head 200 and medium 260.

Writing element 202 includes a write pole 208, a yoke 210, conducting coils 212, a top return pole 214, a top shield 215, a bottom return pole 216, a bottom shield 217, and a via 218. Recording medium 260 includes a recording layer 262, an underlayer 264, and a substrate 266. Recording layer 262 is illustratively a hard magnetic layer that is capable of storing a magnetization pattern, and underlayer 264 is illustratively a soft magnetic material that allows for magnetic flux to pass through. Arrow 217 is illustratively a direction of rotation such as arrow 117 in FIG. 1, and medium 260 optionally rotates in the direction shown by arrow 217.

In an embodiment, electric current is passed through coils 212 to generate magnetic flux 220. Flux 220 passes from a tip 209 of write pole 208, through recording layer 262, into underlayer 264, and across to return poles 214 and 216. The polarity of magnetic flux 220 is illustratively reversed by reversing the polarity of the electric current passed through coils 212. Magnetic flux 220 illustratively records a magnetization pattern to recording layer 262. A magnetization pattern is represented by the up and down arrows shown in the figure. Top and bottom shields 215 and 217 illustratively collect stray magnetic flux from conducting coils 212 and/or yoke 210 to reduce the amount of erasure flux reaching recording medium 260.

Reading element 204 includes a top shield 230, a bottom shield 232, a transducer or magnetoresistive element 234, and a permanent magnet 236. An electrical current is illustratively passed from top shield 230, through magnetoresistive element 234, and back through bottom shield 232. The electrical resistance of magnetoresistive element 234 illustratively changes in response to the magnetic fields from the recording medium beneath it. Recording head 200 is able to determine the magnetization pattern in recording layer 262 by detecting the varying voltage differential across reading element 204. Top shield 230 and bottom shield 232 also act to control the magnetic field that reaches magnetoresistive element 234. For example, shields 230 and 232 reduce the effects of bits written to recording layer 262 that are adjacent to the bit that is intended to be read (i.e. the bit currently beneath magnetoresistive element 234).

Figure 3:
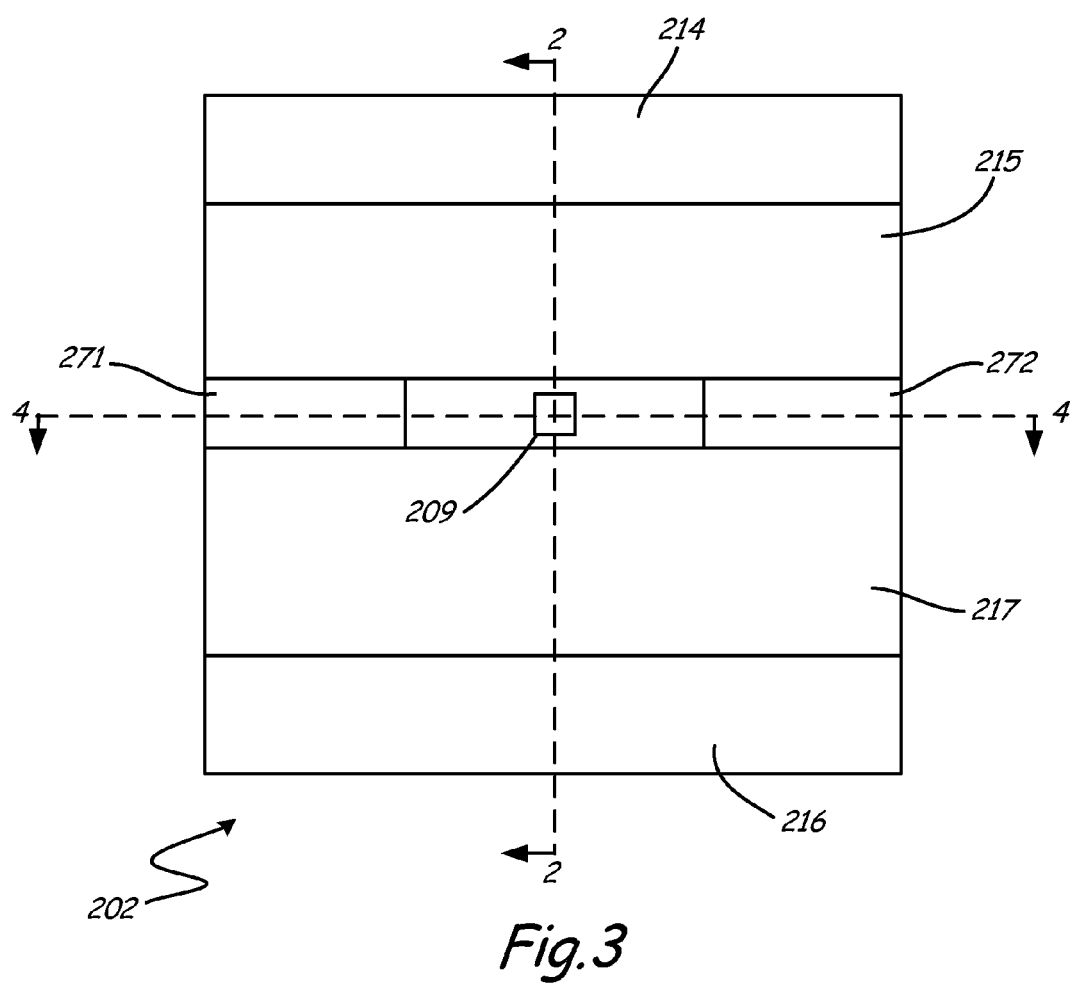
FIG. 3 is a view of a writing element from the air bearing surface side according to an embodiment.

FIG. 3 is a view of writing element 202 from the air-bearing surface side (i.e. from the side facing the recording medium). FIG. 3 shows a cross-sectional line 2-2. The cross-sectional view of writing element 202 in FIG. 2 is from the perspective of line 2-2 in FIG. 3. FIG. 3 includes several of the features shown FIG. 2 such as top return pole 214, bottom return pole 216, top shield 215, bottom shield 217, and write pole tip 209.

FIG. 3 also shows that the recording head optionally includes a first side shield 271 and a second side shield 272. Side shields 271 and 272 illustratively act in cooperation with top and bottom shields 215 and 217 to collect stray magnetization flux (e.g. flux from coils 212 and/or yoke 210 in FIG. 2) to reduce the amount of erasure flux reaching a recording medium.

Figure 4:
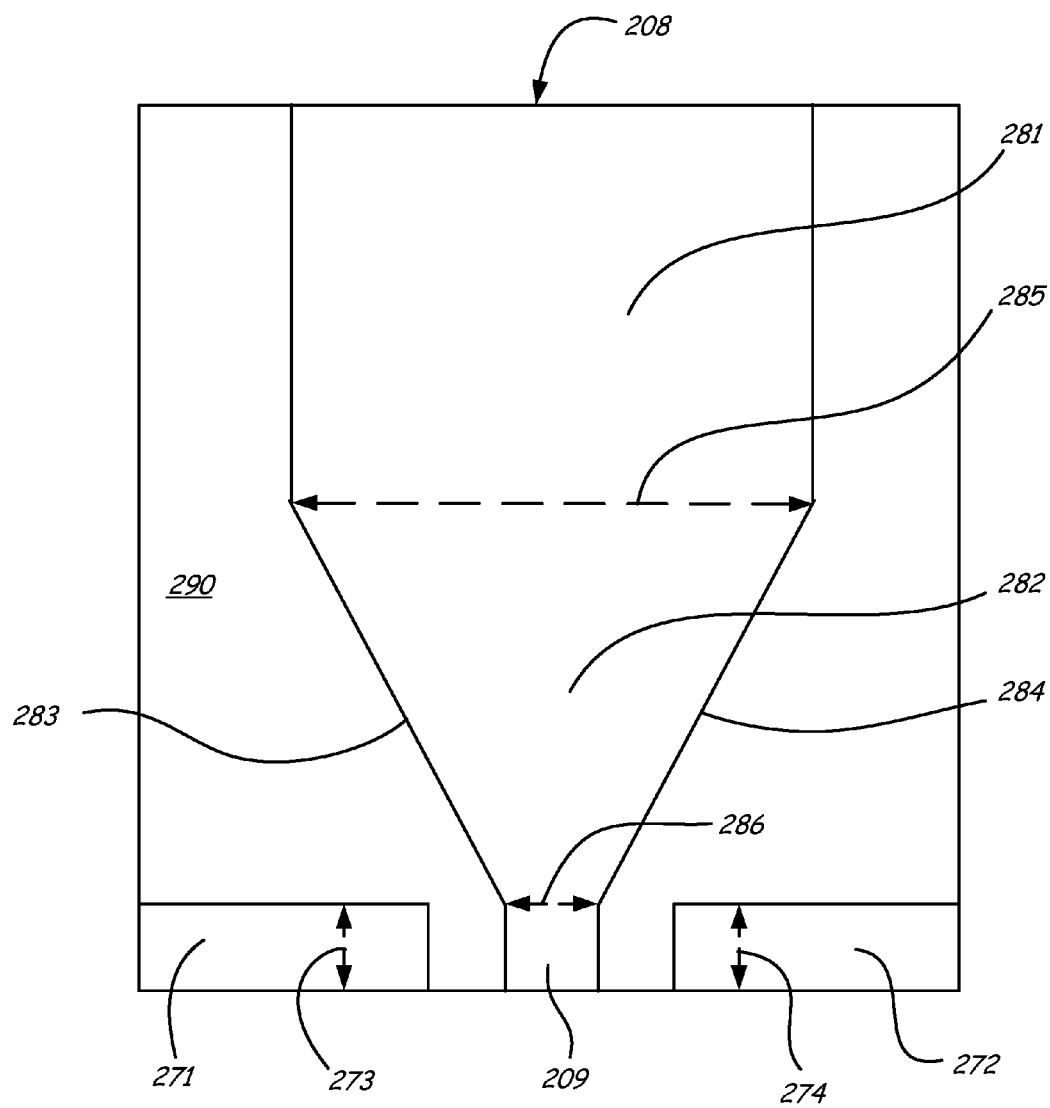
FIG. 4 is a top down view of a writing element according to an embodiment.

FIG. 4 is a top down cross-sectional view of writing element 202. The cross-sectional view of FIG. 4 is from the perspective of line 4-4 in FIG. 3. FIG. 4 shows that write pole 208 optionally includes three regions, a paddle region 281, a flare region 282, and a tip region 209. Paddle region 281 illustratively has a width 285, and tip region 209 illustratively has a width 286. Flare region 282 has a first side 283 and a second side 284 that is not parallel to side 283. Sides 283 and 284 start being spaced apart by width 285 and become closer together until they are spaced apart by width 286 (smaller than 285) as the sides meet at tip region 209. Or, in other words, flare region 282 includes two sides 283 and 284 that are tapered going from paddle region 281 to tip region 209. Write pole 208 is optionally electrically separated from side shields 271 and 272 by a dielectric layer 290 such as, but not limited to, alumina (i.e. $Al_2O_3$).

Figure 5:
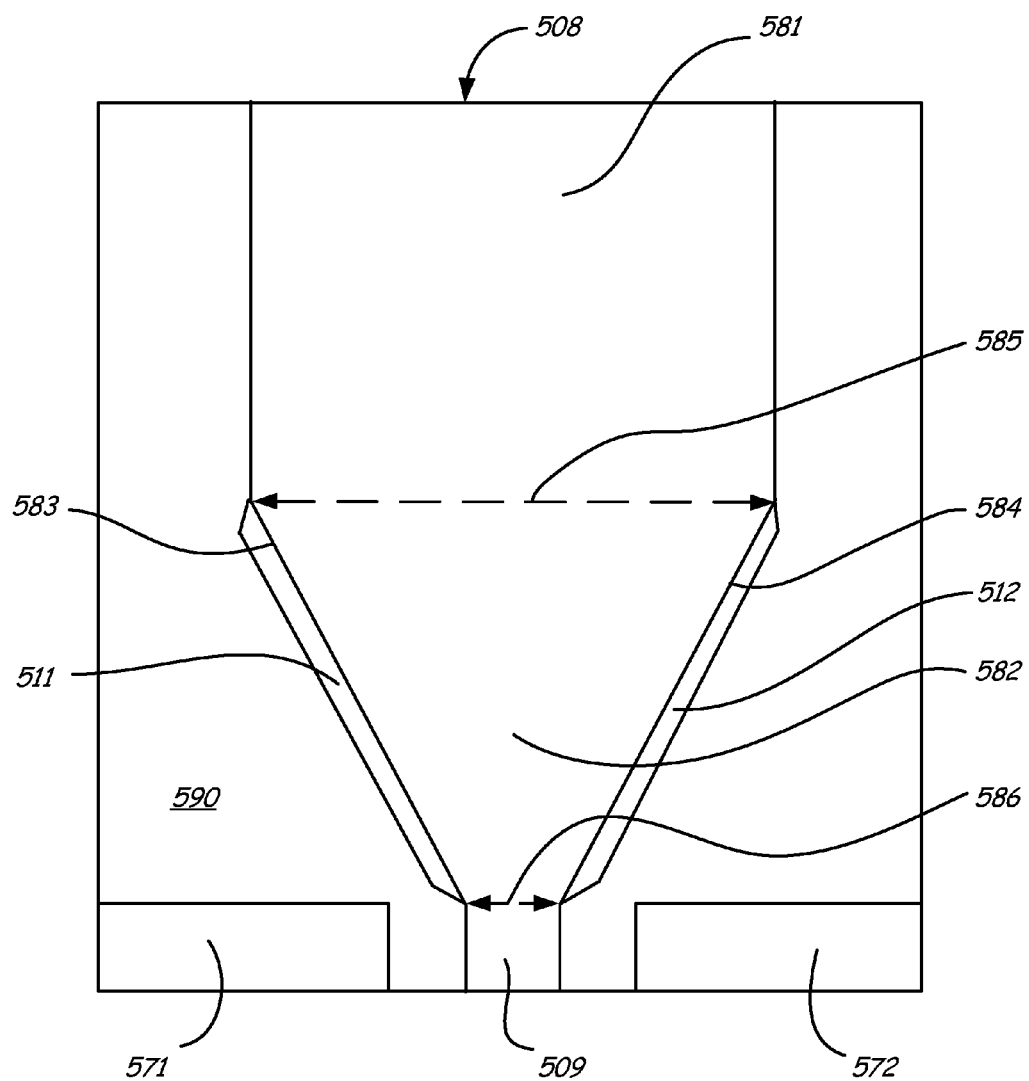
FIG. 5 is a top down view of a writing element having flare region barriers according to an embodiment.

FIG. 5 is a top down cross-sectional view of a writing element 502 according to one embodiment of the present disclosure. Writing element 502 illustratively includes many of the same features as writer 202 in FIG. 4 and is numbered accordingly. Writing element 502 however also includes a first flare region barrier 511 and a second flare region barrier 512. As will be described in greater detail below, flare region barriers 511 and 512 illustratively help to reduce erasure flux and to improve write flux. As is shown in FIG. 5, barriers 511 and 512 are optionally adjacent to flare region sides 583 and 584. Barriers 511 and 512 may however be separated from sides 583 and 584 by one or more layers such as by dielectric 590.

In an embodiment, flare region barriers 511 and 512 are made from an in-plane magnetically anisotropic material. In one particular example, barriers 511 and 512 are made from an easy plane film and have an easy plane of magnetization that is parallel to the sides 583 and 584 of the write pole flare region. In one embodiment, for illustration purposes only and not by limitation, barriers 511 and 512 are made from cobalt iridium (i.e. CoIr) or are made from a material that includes cobalt iridium. Embodiments are not however limited to any specific materials.

Figure 6:
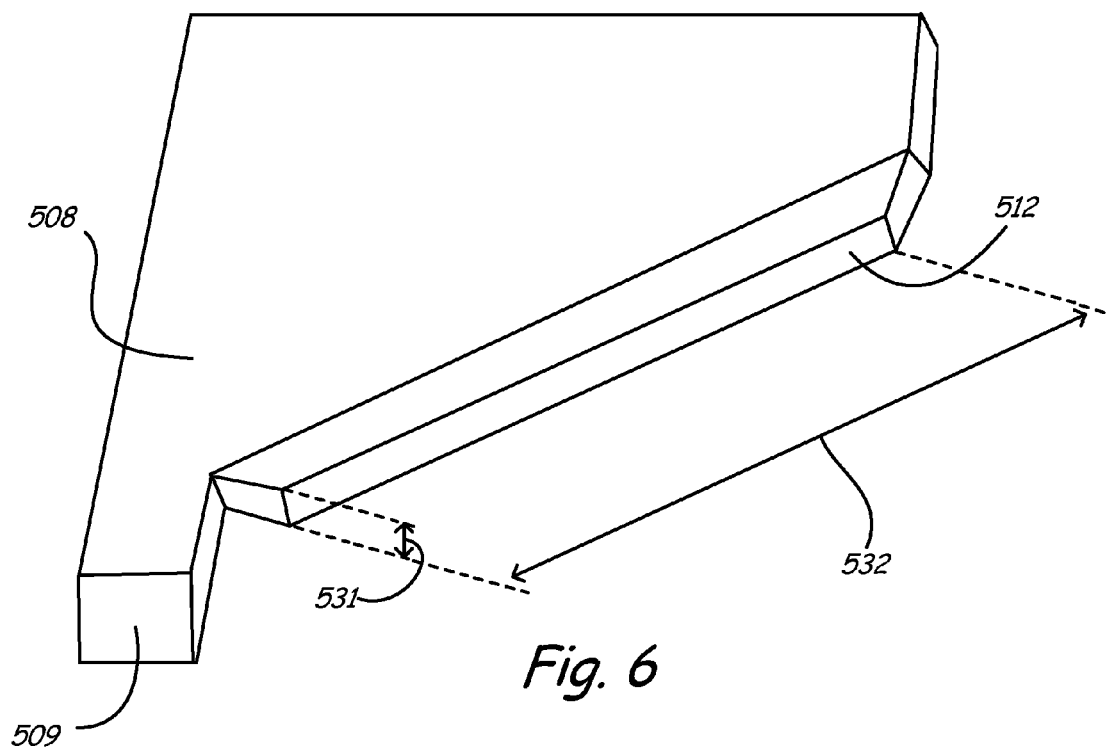
FIG. 6 is a perspective view of a flare region barrier according to an embodiment.

FIG. 6 is a perspective view of write pole 508 and barrier 512. FIG. 6 shows that barrier 512 has a height 531 and a length 532. The easy plane of the barrier illustratively lies in the same plane as the plane defined by the height and length dimensions 531 and 532. In an embodiment, barrier height 531 is the same or approximately the same as the height/thickness of write pole 508. The barrier height 531 may however be greater or less than the write pole height/thickness. Similarly, barrier length 532 is optionally the same or approximately the same length as the write pole flare region side 584. The barrier length 532 may however be greater or less than the write pole flare region length.

Figure 7:
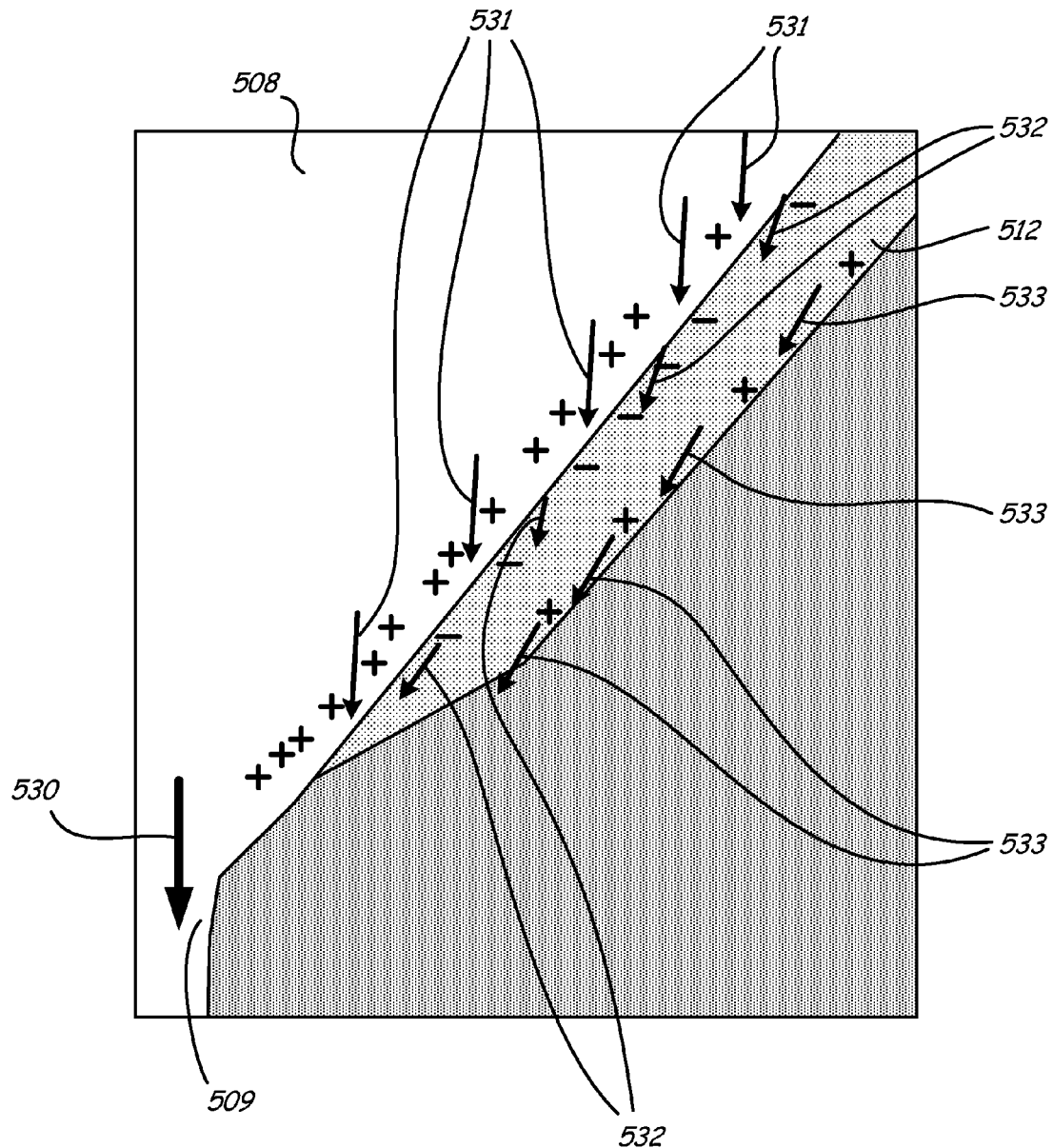
FIG. 7 is a schematic diagram illustrating magnetization and charges in a flare region barrier according to an embodiment.

FIG. 7 illustrates possible magnetization directions and magnetic charges in write pole 508 and flare region barrier 512. Generally speaking, the amount of magnetic flux directed out of the write pole tip 509 may be increased in the direction shown by arrow 530. Such flux may be utilized by a data storage system in writing a magnetization pattern to a recording medium. Relatedly, flux not directed out of the pole tip in the intended direction may escape the write element and lead to unwanted erasure flux.

As is shown in the figure, at least some magnetization 531 along the write pole initially makes a large angle with respect to the surface of the flare region. This leads to large magnetic surface charges. At the inner surface of barrier 512, magnetization is redirected such that it has the direction shown by arrows 532. Then, at the outer surface of the barrier 512, the magnetization is further redirected such that it has the direction shown by arrows 533. Accordingly, barriers may help to redirect magnetization along the flare regions to keep the magnetization within the plane of the barrier (i.e. within the plane of the easy plane film). This illustratively reduces the amount of surface charge along the flare regions and may help to reduce unwanted erasure flux and increase desirable write flux.

Figure 8:
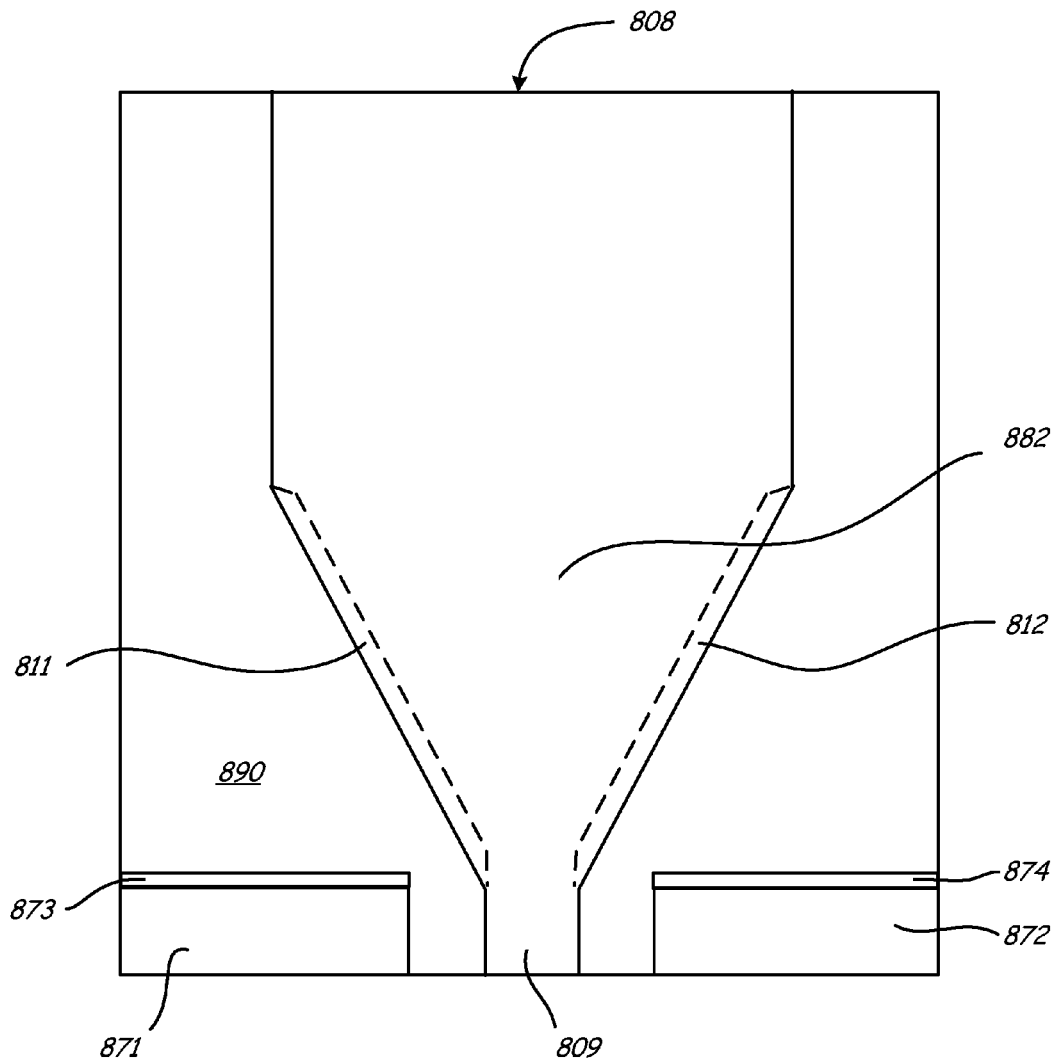
FIG. 8 is a top down view of a writing element having flare region barriers included within a write pole according to an embodiment.

FIG. 8 is a top down cross-sectional view of another embodiment of a writing element 802 having barriers 811 and 812 along the flare region 882 of its write pole 802. In the embodiments shown in FIGS. 5, 6, and 7, the barriers are illustratively made by adding material to sides of write poles. In the embodiment shown in FIG. 8, the barriers 811 and 812 are instead made by adding films within the existing write pole area. Or, in other words, barriers 811 and 812 are included within the volume of the existing write pole such that there is no increase in magnetic volume of the write pole.

In FIG. 8, the areas of the write pole that include the barriers are outlined by the dashed lines. It should be noted however that embodiments of barriers are not limited to any particular shape or configuration. The barriers are optionally made of the same or similar materials as the barriers shown in FIGS. 5, 6, and 7. The barriers for instance are illustratively made from easy plane films and have an easy plane of magnetization. Also similar to the embodiments previously discussed, barriers 811 and 812 may help to reduce stray erasure flux and increase write pole flux by redirecting flux from the flare region towards the write pole tip 809. The barriers illustratively perform as was described in reference to FIG. 7 discussed above.

FIG. 8 also shows additional barriers 873 and 874 that may be optionally included within certain embodiments. Barriers 873 and 874 are illustratively applied to the back sides of side shields 871 and 872, and are separated from write pole 808 by dielectric layer/material 890. In one instance, barriers 873 and 874 are made from an in-plane magnetically anisotropic material and have easy planes of magnetization that are parallel to side shields 871 and 872.

In at least certain embodiments of write elements, magnetic flux from the write pole is drawn to or is directed to its side shields. This may be caused for instance by the construction of the side shields from high magnetically permeable materials. This flux leakage or shunting to the side shields may reduce the amount of flux emitted from the write pole tip and that is utilized in writing to a recording medium. Some embodiments of the barriers described above (e.g. barriers 511 and 512 in FIG. 5, and barriers 811, 812, 873, and 874 in FIG. 8) may reduce the shunting to the side shields and increase the amount of write flux emitted from the pole tip. For example, the side shield barriers 873 and 874 in FIG. 8 may reduce the shunting by limiting the direction of the magnetization motion in the side shields.

Figure 9:
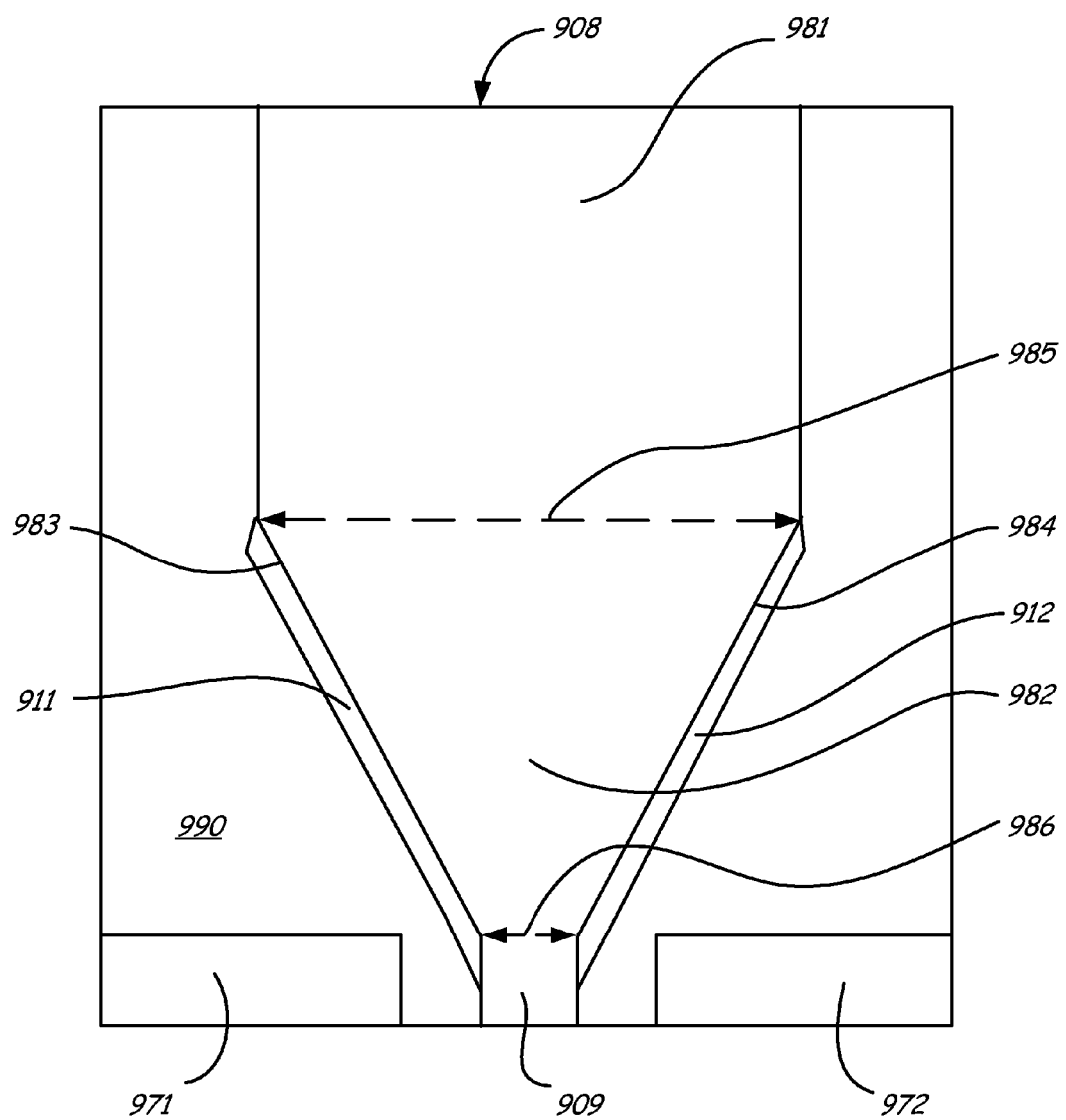
FIG. 9 is a top down view of a writing element having flare region barriers with tapered write pole tip portions according to an embodiment.

FIG. 9 shows an additional embodiment of a writing element 902 having barriers 911 and 912. Writing element 902 optionally has many of the same features as writing element 502 in FIG. 5 and is numbered accordingly. Writing element 902 however differs from writing element 502 in the manner that its flare region barriers 911 and 912 cover/surround a portion of the flare tip region 909. In element 502, flare region barriers 511 and 512 are tapered such that the barriers do not extend over/cover flare tip region 509. In element 902 however, barriers 911 and 912 are tapered such that the barriers do extend over/cover flare tip region 909. Embodiments are not limited to any particular design or configuration and barriers may cover more or less of a flare tip region than is shown in the figures.

Figure 10:
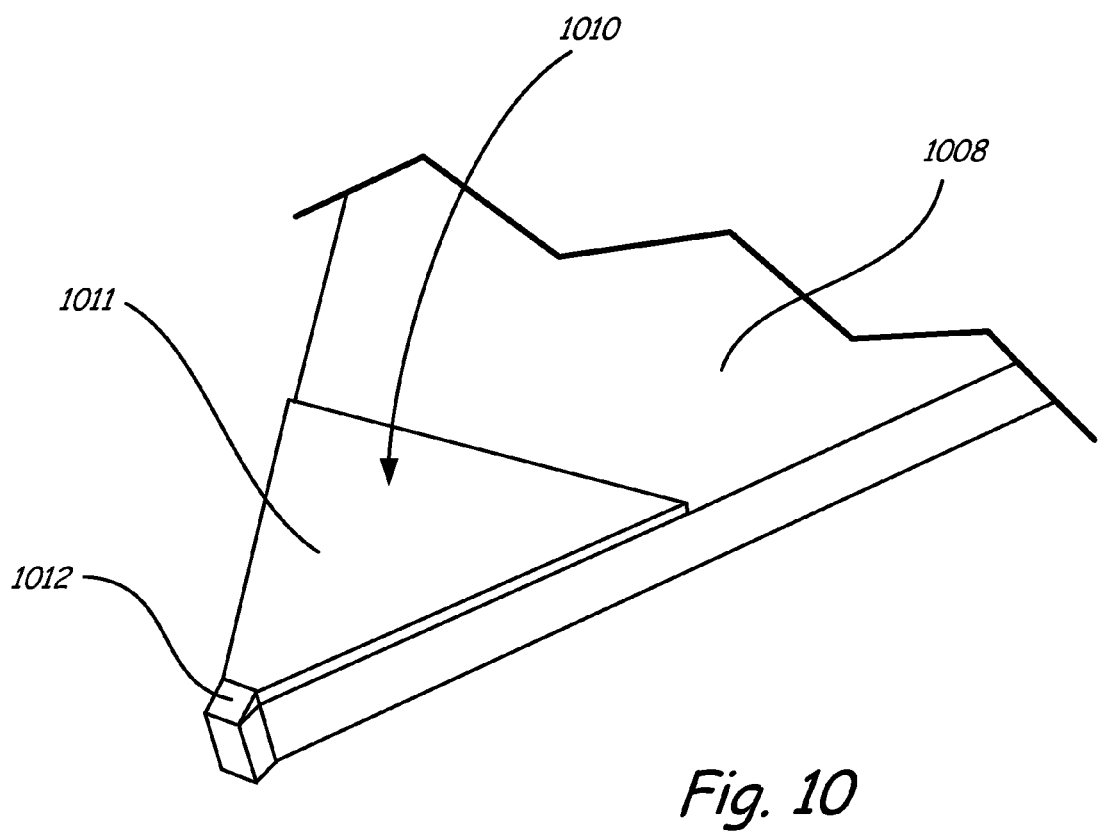
FIG. 10 is a perspective view of a flare region barrier located along the top of a write pole according to an embodiment.
Figure 11:
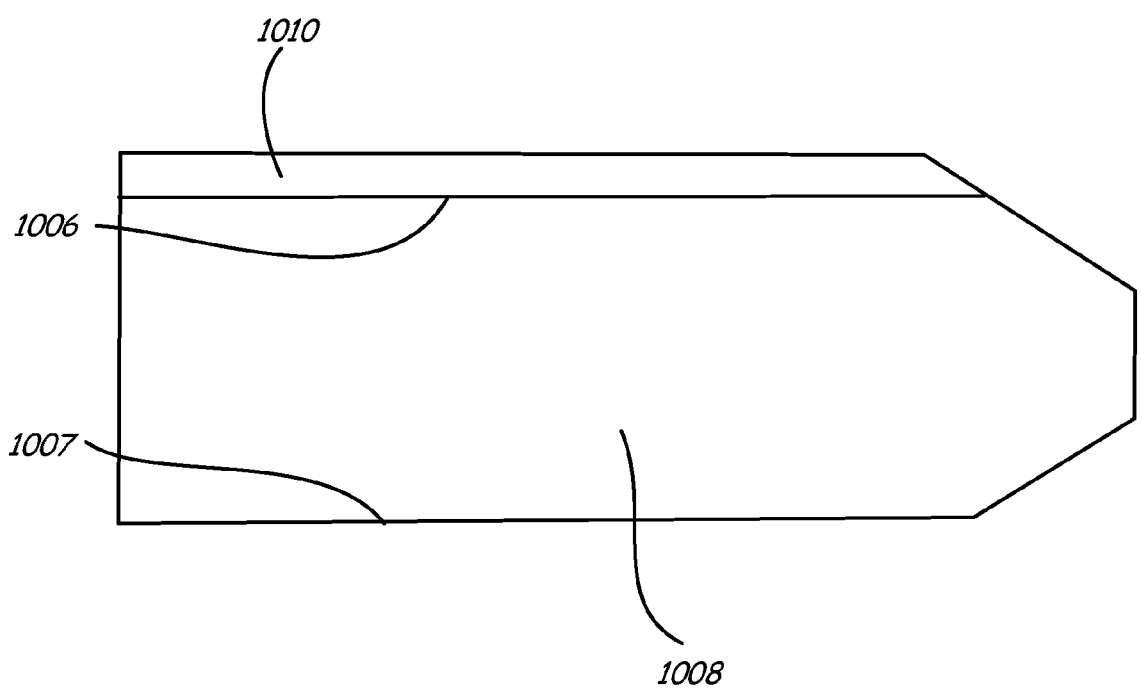
FIG. 11 is a side cross-sectional view of a flare region barrier located along the top of a write pole according to an embodiment.

In addition to barriers along the flare region of a write pole, barriers may also be placed along the tops and/or bottoms (i.e. leading and/or trailing edges) of write poles. FIG. 10 is a perspective view of a write pole 1008 having a top barrier 1010. The figure shows that barrier 1010 includes two portions, a first portion 1011 that covers the flare region of the write pole and a second portion 1012 that covers the pole tip region of the write pole. FIG. 10 shows that the barrier covers only a portion of the flare region of the write pole. In other embodiments, the barrier may cover more or less of the flare region. The barrier may for instance cover the entire flare region or none of the flare region. FIG. 11 is a side cross-sectional view of the write pole 1008 and top barrier 1010 shown in FIG. 10. FIG. 11 shows that write pole 1008 includes a top surface 1006 and a bottom surface 1007. The top and bottom surfaces of the write poles illustratively form planes. In an embodiment, top barrier 1010 (and/or any bottom barrier) are made from a material having an easy plane of magnetization (i.e. an easy plane film) and the easy plane is parallel to the top 1006 and/or bottom 1007 surfaces of the write pole. Such barriers in at least some embodiments may help to keep magnetization in the plane of the write pole thus increasing the write field and reducing stray flux.

FIGS. 12, 13, 14, and 15 show an additional embodiment of a writing element that includes barriers that may reduce erasure flux and increase writing flux. In particular, the figures show a writing element 1202 that includes multilayer shields that act as barriers. As will be described below, the multilayer shields are illustratively made such that each shield has a net magnetic permeability that is zero or that is approximately zero. The zero permeability shields deflect stray magnetic flux away from the shields and increase the write flux emitted from the write pole tip. The barriers/shields shown in FIGS. 12-15 may be used in combination with the barriers shown in FIGS. 5, 6, 8, 9, 10, and 11 or alternatively may be used independently.

Figure 12:
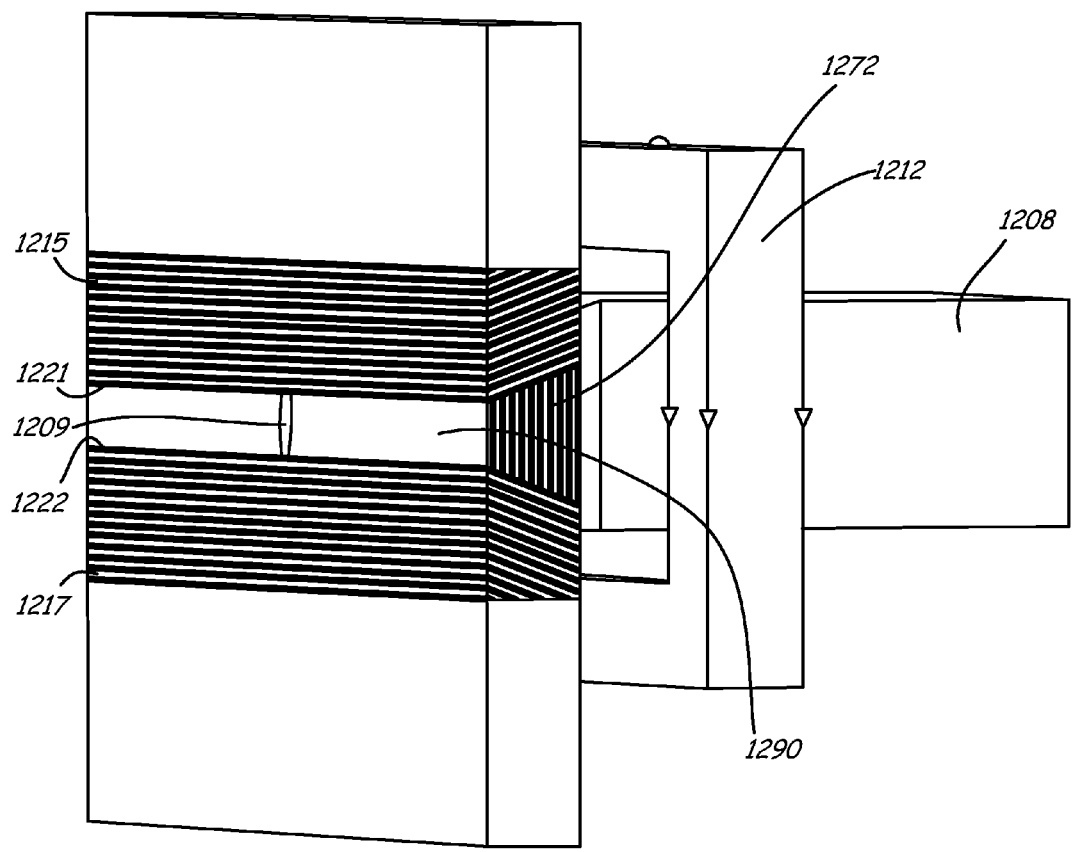
FIG. 12 is a perspective view of a writing element having zero permeability top, bottom, and side shields according to an embodiment.

FIG. 12 shows a schematic perspective view of writing element 1202 from the air bearing surface side. Writing element 1202 include a write pole 1208, a conducting coil 1212, a dielectric layer 1290, a top shield 1215, a bottom shield 1217, and a side shield 1272. Write pole 1208 has a tip 1209 that emits magnetic flux, a top beveled surface 1221, and a bottom beveled surface 1222. The top and bottom beveled surfaces are further shown in FIG. 14.

Figure 13:
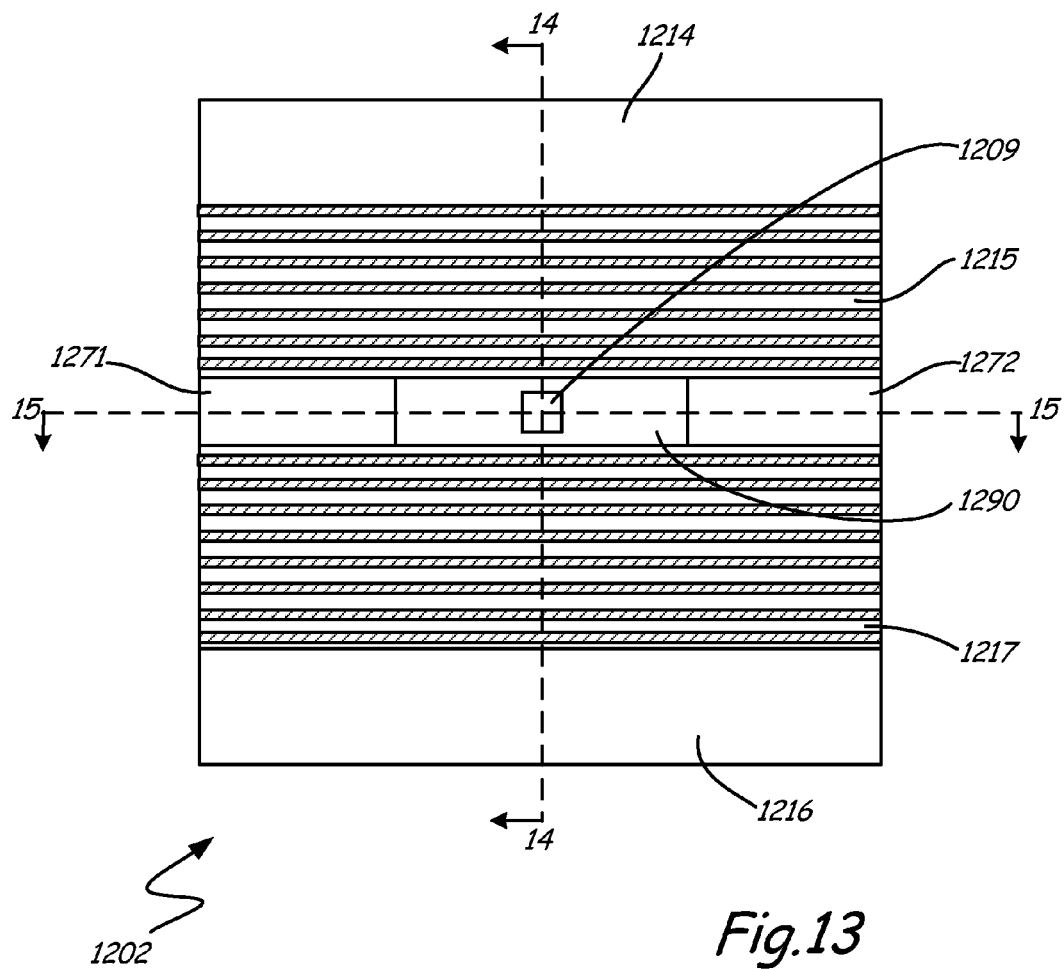
FIG. 13 is a view of a writing element having zero permeability top, bottom, and side shields from the air-bearing surface side according to an embodiment.
Figure 14:
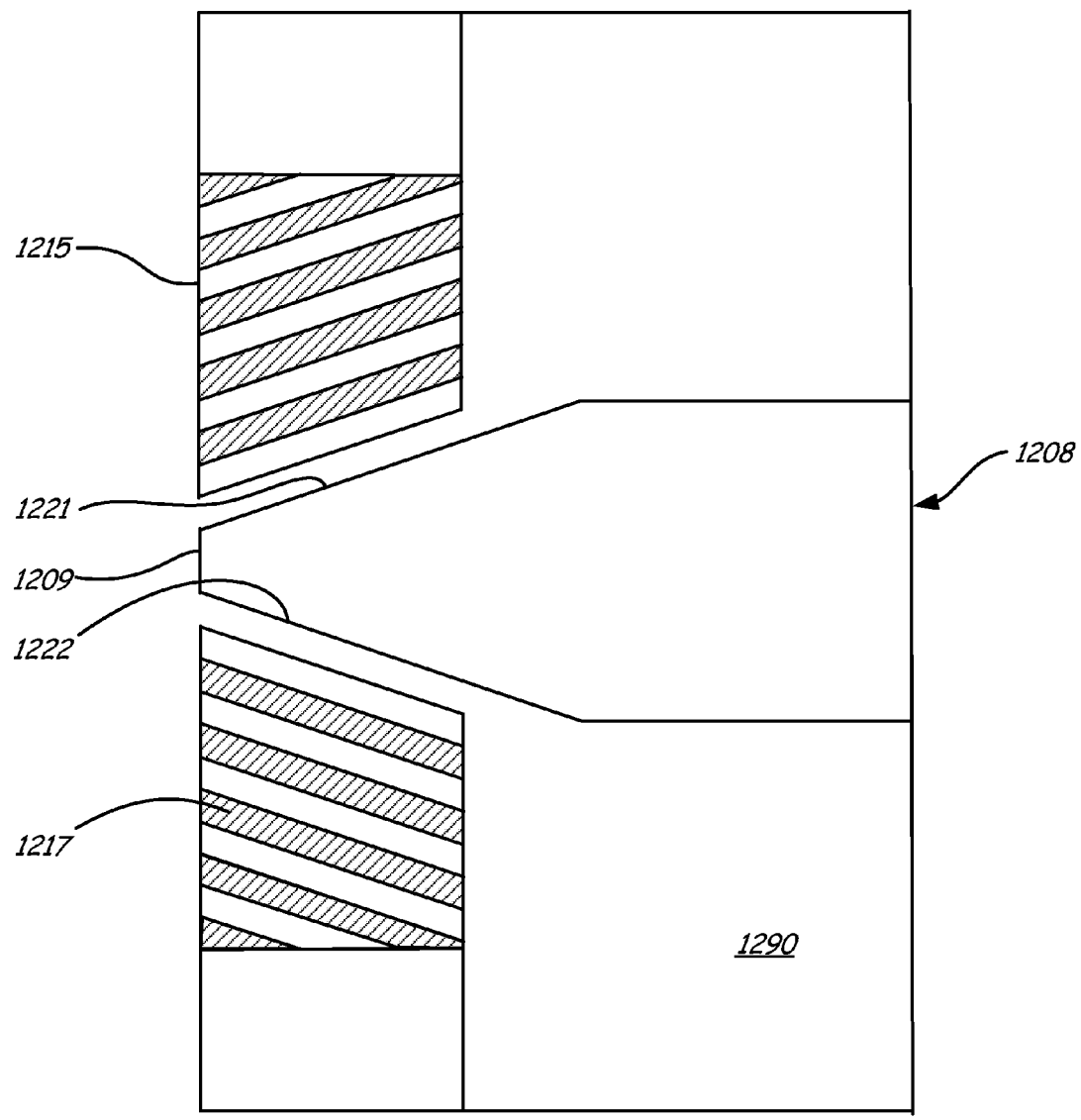
FIG. 14 is a cross-sectional view of a writing element having zero permeability top and bottom shields according to an embodiment.

FIG. 13 shows a top down view of writing element 1202 from the air bearing surface side, and FIG. 14 shows a top down cross-sectional view of writing element 1202 from line 14-14 in FIG. 13. As can be seen in FIGS. 12, 13, 14, each of the layers in the top shield 1215 is parallel or is approximately parallel to each other and to the top beveled surface 1221 of write pole 1208. Similarly, each of the layers in the bottom shield 1217 is parallel or is approximately parallel to each other and to the bottom beveled surface 1222 of write pole 1208.

Figure 15:
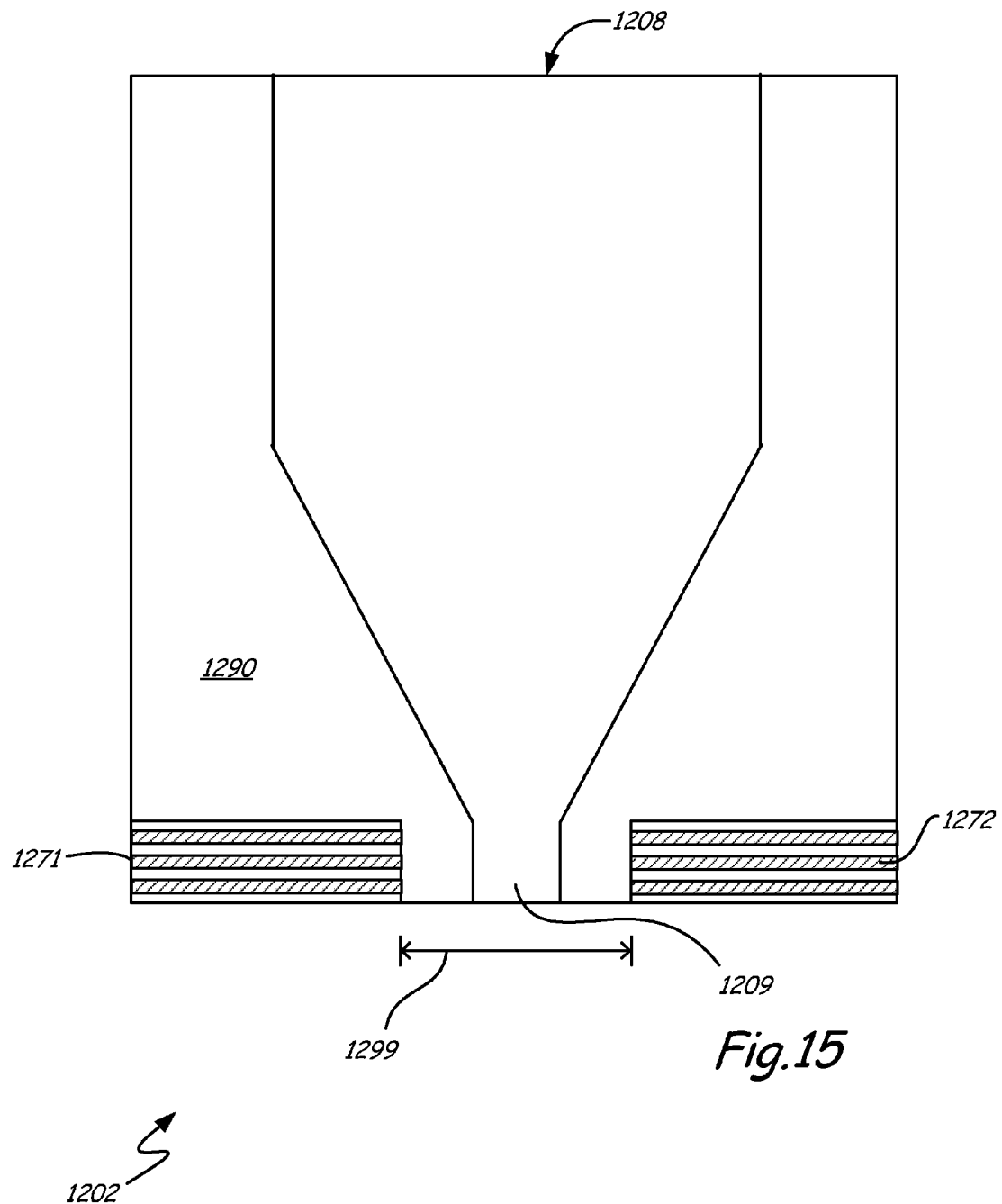
FIG. 15 is a top down view of a writing element having zero permeability side shields according to an embodiment.

FIG. 15 shows a top down cross-sectional view of writing element 1202 from line 15-15 in FIG. 13. As can be seen in FIGS. 12 and 15, each of the layers in the side shields 1271 and 1272 is parallel or is approximately parallel to each other and to the air bearing surface. FIG. 15 also shows that writing element 1202 has a side-to-side shield gap or spacing 1299.

As was previously mentioned, each of shields 1271, 1272, 1215, and 1217 illustratively has a magnetic permeability value that is zero or that is approximately zero. Embodiments are not limited to any particular materials or configuration for the shields. In one embodiment, for illustration purposes only and not by limitation, the shields include layers having positive magnetic permeability values and layers having negative magnetic permeability values. In one example, such as in the one shown in FIGS. 12-15, the positive and negative magnetic layers are alternated. It should also be noted that although the figures show a specific number of alternating positive and negative permeability layers, that embodiments are not limited to any particular number of layers and may include any number of layers.

Each of the layers within a shield illustratively has an absolute permeability value that is the same or approximately the same as each of the other layers in the shield. Or, in other words, each shield is made of alternating layers of positive and negative permeabilities of equal or approximately equal magnitude. In one embodiment, each of the layers is made of a ferromagnetic material and has a thickness of five to fifty nanometers. The permeability of each layer is illustratively achieved by manipulating the magnetic anisotropy, the magnetic moment, or both the magnetic anisotropy and magnetic moment of the layer.

Figure 16:
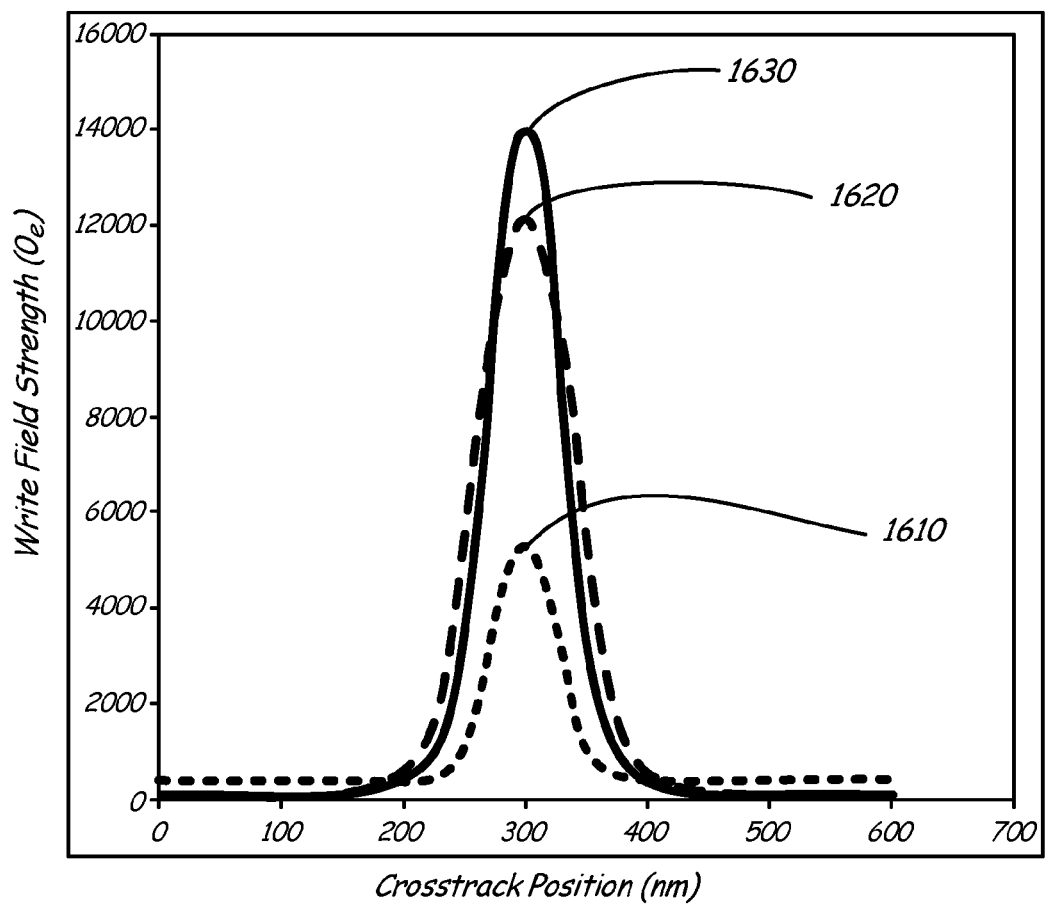
FIG. 16 is a graph of magnetic strength of the write field for writing elements having zero permeability shields according to an embodiment.

FIG. 16 is a graph of magnetic strength of the write field of three different writer designs. Curve 1610 corresponds to a writer having a thirty nanometer side-to-side shield gap and positive permeability shields. Curve 1620 corresponds to a writer having a thirty nanometer side-to-side shield gap and zero permeability shields, and curve 1630 corresponds to a writer having a ten nanometer side-to-side shield gap and zero permeability shields.

As can be seen in the graph, the magnetic strengths of the write fields for the writers having zero permeability shields are greater than that of the writer having a positive permeability shield. In the writer having positive permeability shields, magnetic flux generated by the writer is leaked into the permeable shields. However, in the writers having zero permeability shields, magnetic flux generated by the writers is deflected by the shields and is channeled towards the pole tip where it is utilized to write to a recording medium.

FIG. 16 also shows that for a give side-to-side shield gap, that the cross track width may be greater (i.e. curve 1620 has a greater width than curve 1610) for zero permeability shields. This may cause adjacent tracks on a recording medium to be spaced further apart and reduce areal density. In some embodiments, such as that represented by curve 1630, the side-to-side shield gap is decreased. As is illustrated in the graph, this both reduces the cross track width and increases the write field strength, both of which may allow for higher areal densities. It should be noted that in writers having non-zero permeability shields that reduction of the side-to-side shield gap may lead to a reduction in write field strength. Accordingly, at least some embodiments of the present disclosure provide the advantage may increase write strength while reducing the side-to-side shield gap.

Figure 17:
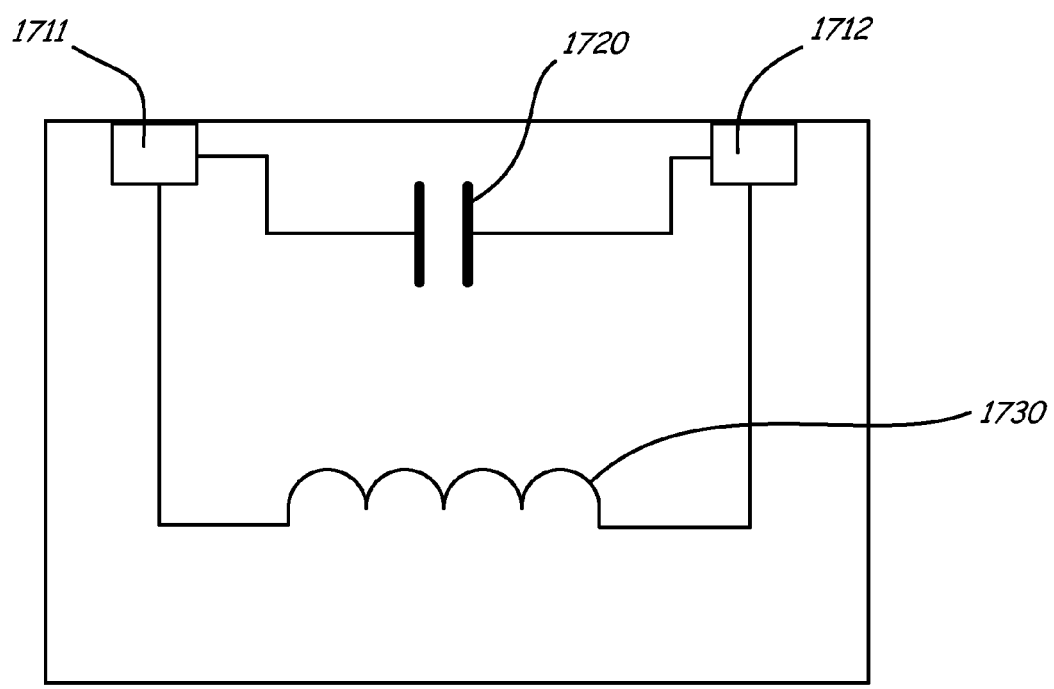
FIG. 17 is an electrical diagram of a recording head having an electrical signal filter in series with a writing element according to an embodiment.

FIG. 17 is a simplified electrical diagram of a recording head 1702 according to one embodiment of the present disclosure. Recording head 1702 includes a writing element 1730 (e.g. writer 202 in FIG. 2) and electrical connection points or pads 1711 and 1712. Recording head 1702 also illustratively includes an electrical signal filter 1720 that is in electrical series with the writing element 1730.

In some embodiments of the present disclosure, writing elements have shields that have zero permeability for only a given frequency range of a magnetic field. For instance, the zero permeability shields may be made of a ferromagnetic material that only has a negative permeability in a certain frequency range during ferromagnetic resonance. In such cases, a filter such as filter 1720 is optionally utilized to remove signals outside of the range. In one embodiment, filter 1720 is a high pass filter such as, but not limited to, a capacitor. The filter is illustratively included within the thin film recording head, but may also be included outside of the recording head.

As has been described above, embodiments of the present disclosure include barriers that may reduce magnetic flux that causes erasures and that increase magnetic flux utilized to write to a recording medium. Certain embodiments accomplish this by placing barriers around the flare region of the write pole. Some other embodiments accomplish this by utilizing zero permeability top, bottom, and/or side shields that block and redirect magnetic flux towards the write pole tip. Consequently, recording heads having writing elements according to the present disclosure may be useful in increasing the areal density of a data storage system.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of systems including data storage systems, without departing from the scope and spirit of the disclosure.

What is claimed is:

1. A recording head comprising:
a write pole having a flare region; and
an in-plane magnetically anisotropic layer that directly contacts at least a portion of the flare region, wherein the write pole has a paddle region, and wherein the in-plane magnetically anisotropic layer is tapered as it approaches the paddle region.

2. The recording head of claim 1, wherein the flare region of the write pole includes a first side and a second side, wherein the in-plane magnetically anisotropic layer includes a first barrier and a second barrier, and wherein the first barrier directly contacts at least a portion of the first side of the flare region, and the second barrier directly contacts at least a portion of the second side of the flare region.

3. The recording head of claim 2, wherein each of the first side of the flare region, the second side of the flare region, the first barrier, and the second barrier includes a height, and wherein the heights are approximately equal, wherein the write pole has a paddle region and a tip region, wherein the first barrier directly contacts the first side of the flare region between the paddle region and the tip region, and wherein the second barrier directly contacts the second side of the flare region between the paddle region and the tip region.

4. The recording head of claim 2, wherein each of the first side of the flare region and the second side of the flare region includes a first height, wherein each of the first barrier and the second barrier includes a second height, and wherein the first and the second heights are unequal, wherein the recording head further comprises a dielectric layer, and wherein the dielectric layer is separated from the first and the second sides of the flare region by the first and the second barriers.

5. The recording head of claim 4, wherein the first height is greater than the second height, wherein the write pole has a tip region, and wherein the dielectric layer directly contacts at least a portion of the tip region.

6. The recording head of claim 4, wherein the first height is less than the second height, and wherein the dielectric layer comprises an oxide.

7. The recording head of claim 6, wherein the oxide comprises alumina.

8. The recording head of claim 1, wherein the write pole has a tip region, and wherein the in-plane magnetically anisotropic layer is tapered as it approaches the tip region.

9. The recording head of claim 8, wherein the paddle region and the tip region are at least partially in direct contact with a dielectric layer.

10. A data storage system writing element comprising:
a write pole having a flare region and a tip region; and
a magnetic flux barrier along the write pole flare region that is tapered as it approaches the tip region, wherein the magnetic flux barrier is made from a material that includes cobalt iridium, and wherein the magnetic flux barrier extends beyond the write pole flare region and covers at least a portion of the tip region.

11. The writing element of claim 10, wherein the writing element further comprises a dielectric layer, the dielectric layer being separated from the flare region by the magnetic flux barrier, and the dielectric layer being in direct contact with at least a portion of the tip region.

12. A data storage system writing element comprising:
a write pole having a paddle region, a tip region, and a flare region, the flare region extending between the paddle and the tip regions;
a dielectric layer; and
a magnetic flux barrier that is interposed in between the flare region of the write pole and the dielectric layer, wherein the magnetic flux barrier comprises an in-plane magnetically anisotropic layer, and wherein the dielectric layer at least partially contacts the paddle region and the tip region.

13. The writing element of claim 12, wherein the magnetic flux barrier has an easy plane of magnetization.

14. The writing element of claim 12, wherein the magnetic flux barrier directly contacts at least a portion of the flare region.

15. The writing element of claim 12, wherein the magnetic flux barrier directly contacts the flare region for an entire length of the magnetic flux barrier.

16. The writing element of claim 12, wherein the flare region includes first and second sides that extend between the paddle and the tip regions, and wherein the dielectric layer comprises alumina.

17. The writing element of claim 16, wherein the magnetic flux barrier includes first and second barriers, wherein the first barrier is proximate to the first flare region side, wherein the second barrier is proximate to the second flare region side, and wherein the first and the second barriers are tapered.

18. A data storage system writing element comprising:
a write pole having a flare region and a tip region; and
a magnetic flux barrier along the write pole flare region that is tapered as it approaches the tip region, wherein the magnetic flux barrier ends at the write pole flare region such that no portion of the tip region is covered by the magnetic flux barrier.

* * * * *